US009988072B2

(12) United States Patent
Matsuda et al.

(10) Patent No.: US 9,988,072 B2
(45) Date of Patent: Jun. 5, 2018

(54) STEERING APPARATUS

(71) Applicant: JTEKT CORPORATION, Osaka-shi, Osaka (JP)

(72) Inventors: Satoshi Matsuda, Okazaki (JP); Tomonari Yamakawa, Hoi-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 33 days.

(21) Appl. No.: 15/161,901

(22) Filed: May 23, 2016

(65) Prior Publication Data

US 2016/0347356 A1  Dec. 1, 2016

(30) Foreign Application Priority Data

May 29, 2015 (JP) ................................ 2015-109710
Sep. 14, 2015 (JP) ................................ 2015-181010

(51) Int. Cl.
*B62D 5/04* (2006.01)
*B62D 5/00* (2006.01)

(52) U.S. Cl.
CPC ........... *B62D 5/0433* (2013.01); *B62D 5/001* (2013.01); *B62D 5/003* (2013.01); *B62D 5/0478* (2013.01)

(58) Field of Classification Search
CPC ...... B62D 5/0433; B62D 5/001; B62D 5/003; B62D 5/0478
See application file for complete search history.

(56) References Cited

U.S. PATENT DOCUMENTS 6,899,196 B2 * 5/2005 Husain ................... B62D 5/005
                                                           180/402
7,628,245 B2 * 12/2009 Osonoi .................. B62D 1/163
                                                           180/403
(Continued)

FOREIGN PATENT DOCUMENTS

DE   102004050014 A1   6/2005
EP        1205371 A2   5/2002
(Continued)

OTHER PUBLICATIONS

Oct. 24, 2016 Extended European Search Report issued in Patent Application No. 16171106.4.

*Primary Examiner* — Kevin Hurley
*Assistant Examiner* — Michael R Stabley
(74) *Attorney, Agent, or Firm* — Oliff PLC (57) ABSTRACT

A steering apparatus is provided which can suppress unintended movement of a steering wheel when a clutch is engaged. When a power switch is turned off and a steering wheel is steered, a reaction force control circuit makes a reaction force motor to generate a steering reaction force stronger than a normal steering reaction force to give a driver an appropriate feeling of response according to a steering torque. The strong steering reaction force is applied to a steering shaft to suppress steering of the steering wheel. A steering operation control circuit executes steering operation control, that is, control that makes an actual steered angle equal to a target steered angle based on a steering angle, and then a clutch is engaged. The clutch is engaged after confirmation of an immovable state of steered wheels, and thus rotation of the steering wheel unintended by the driver is suppressed.

13 Claims, 4 Drawing Sheets

(56) References Cited

U.S. PATENT DOCUMENTS

| | | | | |
|---|---|---|---|---|
| 7,690,475 | B2* | 4/2010 | Tsutsumi | B62D 5/001 180/402 |
| 2002/0059021 | A1* | 5/2002 | Nishizaki | B62D 5/003 701/41 |
| 2005/0082107 | A1* | 4/2005 | Husain | B62D 5/005 180/402 |
| 2006/0169519 | A1* | 8/2006 | Osonoi | B62D 1/163 180/402 |
| 2007/0215405 | A1* | 9/2007 | Tsutsumi | B62D 5/001 180/402 |

FOREIGN PATENT DOCUMENTS

| | | |
|---|---|---|
| EP | 1676767 A2 | 7/2006 |
| EP | 1829765 A2 | 9/2007 |
| JP | 2014-223862 A | 12/2014 |

* cited by examiner

STEERING APPARATUS

INCORPORATION BY REFERENCE

The disclosure of Japanese Patent Application No. 2015-109710 filed on May 29, 2015 and No. 2015-181010 filed on Sep. 14, 2015 including the specification, drawings and abstract, is incorporated herein by reference in its entirety.

BACKGROUND OF THE INVENTION

1. Field of the Invention

The invention relates to a steering apparatus for a vehicle.

2. Description of the Related Art

What is called steer-by-wire steering apparatuses are conventionally known in which a steering wheel is mechanically separated from steered wheels. For example, a steering apparatus in Japanese Patent Application Publication No. 2014-223862 (JP 2014-223862 A) has a clutch that connects and disconnects a power transmission path between the steering wheel and the steered wheels, a reaction force motor that is a source of a steering reaction force applied to the steering shaft, and a steering operation motor that is a source of a steering operation force making the steered wheels to be steered.

While a vehicle is traveling, a control apparatus for the steering apparatus makes the clutch to be released to keep the steering wheel mechanically separated from the steered wheels. The control apparatus then generates a steering reaction force through the reaction force motor and makes the steered wheels to be steered through a steering operation motor. In contrast, when the reaction force motor or the like becomes abnormal, the control apparatus makes the clutch to be engaged to keep the steering wheel mechanically coupled to the steered wheels. Consequently, the steered wheels can be steered by use of a steering torque applied by a driver.

In many of the conventional steering apparatuses including the steering apparatus in JP 2014-223862 A, when the vehicle is powered off, the clutch is engaged in view of fail safety and the like. In this case, reaction force control through the reaction force motor and steering operation control through the steering operation motor may be continuously executed after an operation of powering off the vehicle is executed and until the engagement of the clutch is completed.

Thus, when the operation of powering off the vehicle is executed during steering of the steering wheel, the following situation may occur. For example, the moment the clutch is engaged, the steering operation force generated by the steering operation motor may be transmitted to the steering wheel, causing rotation of the steering wheel unintended by a driver.

SUMMARY OF THE INVENTION

An object of the invention is to provide a steering apparatus that makes unintended movement of a steering wheel to be suppressed when a clutch is engaged.

According to an aspect of the invention, a steering apparatus includes: a clutch that connects and disconnects a power transmission path between a steering wheel and a steered wheel; a reaction force motor that generates a steering reaction force that is a torque acting in a direction opposite to a steering direction and applied to a portion of the power transmission path located between the steering wheel and the clutch; a steering operation motor that generates a steering operation force that is power making the steered wheel to be steered and that is applied to a portion of the power transmission path located between the clutch and the steered wheel; and a control apparatus that executes engagement and disengagement control for the clutch based on whether or not a clutch engagement condition is satisfied, reaction force control that generates, through the reaction force motor, a steering reaction force corresponding to a steering state, and steering operation control that makes the steered wheel to be steered in accordance with the steering state through the steering operation motor. When the clutch engagement condition is satisfied and a state where the power transmission path is disconnected is switched to a state where the power transmission path is connected, the control apparatus executes rotation suppression control that suppresses rotation of the steering wheel through the reaction force motor or through both the reaction force motor and the steering operation motor.

When the clutch is engaged, the reaction force control through the reaction force motor and the steering operation control through the steering operation motor may each be continuously executed. Thus, when the clutch is engaged, an operation of steering the steered wheel may be transmitted to the steering wheel through the power transmission path even for a short period of time. This may cause rotation of the steering wheel unintended by a driver. In this regard, the above-described configuration suppresses rotation of the steering wheel through the rotation suppression control that uses at least the reaction force motor when the clutch is engaged. Thus, rotation of the steering wheel unintended by the driver is suppressed.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
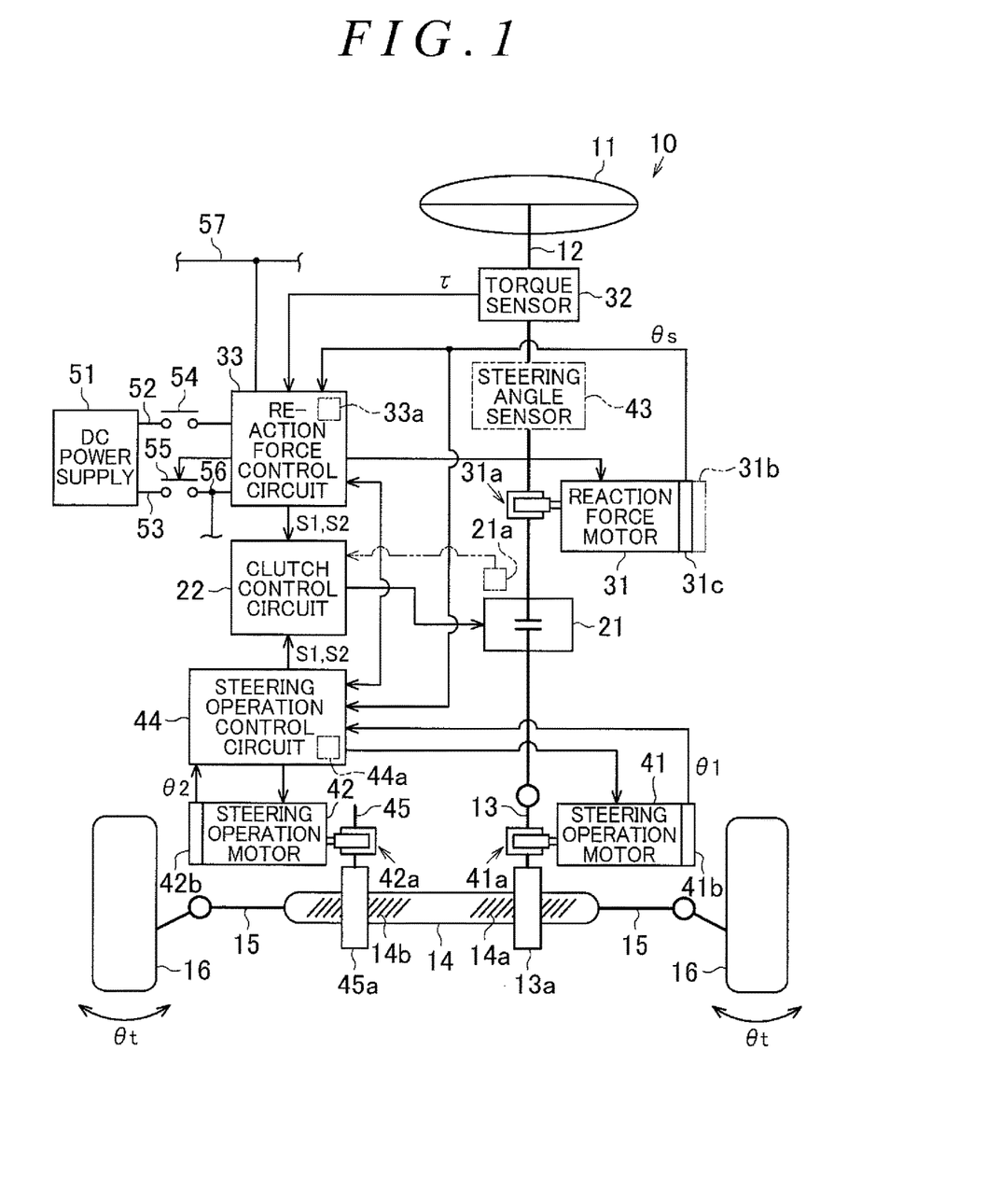
FIG. 1 is a block diagram depicting a first embodiment of a steering apparatus.

A steer-by-wire steering apparatus that is a first embodiment of the present invention will be described below. As depicted in FIG. 1, a steering apparatus 10 for a vehicle has a steering shaft 12 coupled to a steering wheel 11. A first pinion shaft 13 is provided at an end of the steering shaft 12 opposite to the steering wheel 11. Pinion teeth 13a of the first pinion shaft 13 are meshed with first rack teeth 14a of a steered shaft 14 extending in a direction crossing the pinion teeth 13a. Right and left steered wheels 16, 16 are coupled to respective opposite ends of the steered shaft 14 via respective tie rods 15, 15. The steering shaft 12, the first pinion shaft 13, and the steered shaft 14 function as a power transmission path between the steering wheel 11 and the steered wheels 16, 16. That is, in conjunction with an operation of rotating the steering wheel 11, the steered shaft 14 moves linearly to vary a steered angle θt of the steered wheels 16 and 16.

The steering apparatus 10 also has a clutch 21 and a clutch control circuit 22. The clutch 21 is provided in the middle of the steering shaft 12. As the clutch 21, for example, an electromagnetic clutch is adopted which enables and disables transmission of power through enabling and disabling of current conduction to an excitation coil not depicted in the drawings. When the clutch 21 is disengaged, the power transmission path between the steering wheel 11 and the steered wheels 16, 16 is mechanically disconnected. When the clutch 21 is engaged, the power transmission path between the steering wheel 11 and the steered wheels 16, 16 is mechanically connected.

The clutch control circuit 22 controls engagement and disengagement of the clutch 21. For example, the clutch control circuit 22 conducts current through an excitation coil in the clutch 21 to switch a state where the clutch 21 is engaged to a state where the clutch 21 is disengaged. The clutch control circuit 22 stops current conduction through the excitation coil in the clutch 21 to switch the state where the clutch 21 is disengaged to the state where the clutch 21 is engaged.

The steering apparatus 10 has a reaction force motor 31, a rotation angle sensor 31c, a torque sensor 32, and a reaction force control circuit 33 as a reaction force unit that is a configuration for generating a steering reaction force. The steering reaction force refers to force (torque) acting in a direction opposite to a direction in which the steering wheel 11 is operated by a driver. Application of the steering reaction force to the steering wheel 11 enables an appropriate feeling of response to be given to the driver according to a road reaction force.

The reaction force motor 31 is a source of the steering reaction force. As the reaction force motor, for example, a three-phase (U, V, and W) brushless motor is adopted. The reaction force motor 31 (to be exact, a rotating shaft thereof) is coupled via a reduction mechanism 31a to a portion of the steering shaft 12 closer to the steering wheel 11 than the clutch 21. A torque of the reaction force motor 31 is applied to the steering shaft 12 as the steering reaction force.

The rotation angle sensor 31c detects a rotation angle of the reaction force motor 31. The rotation angle of the reaction force motor 31 detected through the rotation angle sensor 31c is used to calculate a steering angle θs. The reaction force motor 31 and the steering shaft 12 are interlocked with each other via the reduction mechanism 31a. Thus, the rotation angle of the reaction force motor 31 is correlated with the rotation angle of the steering shaft 12 and thus with the steering angle θs, which is the rotation angle of the steering wheel 11. Therefore, the steering angle θs can be determined based on the rotation angle of the reaction force motor 31. In FIG. 1, for convenience of description, an output from the rotation angle sensor 31c is denoted by θs, which represents the steering angle.

The torque sensor 32 detects a steering torque τ applied to the steering shaft 12 via the steering wheel 11. The torque sensor 32 is provided on a portion of the steering shaft 12 closer to the steering wheel 11 than a portion of the steering shaft 12 to which the reduction mechanism 31a is coupled.

The reaction force control circuit 33 executes reaction force control that generates a steering reaction force corresponding to the steering torque τ, through driving control of the reaction force motor 31. That is, the reaction force control circuit 33 calculates a target steering reaction force based on the steering torque ι detected through the torque sensor 32. The reaction force control circuit 33 then controls power feeding to the reaction force motor 31 so as to make the actual steering reaction force applied to the steering shaft 12 equal to the target steering reaction force.

The reaction force control circuit 33 executes engagement and disengagement control that switches between engagement and disengagement of the clutch 21 based on whether or not a clutch engagement condition described below is satisfied. To make the clutch 21 to be engaged, the reaction force control circuit 33 generates a clutch engagement command S1 to the clutch control circuit 22. The clutch control circuit 22 switches the state where the clutch 21 is disengaged to the state where the clutch 21 is engaged based on the clutch engagement command S1. To make the clutch 21 to be disengaged, the reaction force control circuit 33 generates a clutch disengagement command S2 to the clutch control circuit 22. The clutch control circuit 22 switches the state where the clutch 21 is engaged to the state where the clutch 21 is disengaged based on the clutch disengagement command S2.

The reaction force control circuit 33 also executes rotation suppression control making suppression of rotation of the steering wheel 11 unintended by the driver. The rotation suppression control refers to the power feeding control for the reaction force motor 31 executed so as to generate a steering reaction force stronger than a steering reaction force generated through execution of normal reaction force control in order to suppress rotation of the steering wheel 11 unintended by the driver. The reaction force control circuit 33 determines a steering direction based on a change in steering torque τ detected through the torque sensor 32 or a change in steering angle θs detected through the rotation angle sensor 31c. The reaction force control circuit 33 then controls the power feeding to the reaction force motor 31 so as to generate a steering reaction force that acts in a direction opposite to the detected steering direction and that is stronger than a steering reaction force generated through execution of normal reaction force control corresponding to the steering torque τ detected through the torque sensor 32. The steering reaction force stronger than the normal reaction force is applied to the steering shaft 12 in order to give the driver the appropriate feeling of response according to the steering state. Thus, steering of the steering wheel 11 is suppressed.

The steering apparatus 10 also has a first steering operation motor 41, a second steering operation motor 42, a first rotation angle sensor 41b, a second rotation angle sensor 42b, and a steering operation control circuit 44, as a steering operation unit that is a configuration for generating a steering operation force making the steered wheels 16, 16 to be steered.

The first steering operation motor 41 is a source of a steering operation force. As the first steering operation motor 41, for example, a three-phase brushless motor is adopted. The first steering operation motor 41 (to be exact, a rotating shaft thereof) is coupled to the first pinion shaft 13 via a reduction mechanism 41a. A torque of the first steering operation motor 41 is applied to the steered shaft 14 via the first pinion shaft 13 as a first steering operation force.

The second steering operation motor 42 is a source of a steering operation force. A three-phase brushless motor may also be adopted as the second steering operation motor 42. The second steering operation motor 42 (to be exact, a rotating shaft thereof) is coupled to a second pinion shaft 45 via a reduction mechanism 42a. Pinion teeth 45a of the second pinion shaft 45 are meshed with second rack teeth 14b on the steered shaft 14. A torque of the second steering operation motor 42 is applied to the steered shaft 14 via the second pinion shaft 45 as a second steering operation force.

The steered shaft 14 moves in a vehicle width direction (a lateral direction in FIG. 1) according to rotation of at least one of the first steering operation motor 41 and the second steering operation motor 42. The first rotation angle sensor 41b is integrated with the first steering operation motor 41. The first rotation angle sensor 41b detects a rotation angle θ1 of the first steering operation motor 41. The second rotation angle sensor 42b is integrated with the second steering operation motor 42. The second rotation angle sensor 42b detects a rotation angle θ2 of the second steering operation motor 42.

The steering operation control circuit 44 executes steering operation control that steers the steered wheels 16, 16 in accordance with the steering state, through driving control of the first steering operation motor 41 and the second steering operation motor 42. The steering operation control circuit 44 calculates a target steered angle for the steered wheels 16, 16 based on at least one of the rotation angle θ1 of the first steering operation motor 41 and the rotation angle θ2 of the second steering operation motor 42, and the steering angle θs detected through the rotation angle sensor 31c. The steering operation control circuit 44 controls power feeding to each of the first steering operation motor 41 and the second steering operation motor 42 so as to make the actual steered angle θ detected based on at least one of the rotation angles θ1, θ2 of the first and second steering operation motors 41, 42, respectively, equal to the target steered angle. In the present example, the steered wheels 16, 16 are steered by an amount corresponding to an operation of the steering wheel 11. That is, the power feeding to the first steering operation motor 41 and the second steering operation motor 42 is controlled so as to make the actual steered angle θt equal to the steering angle θs. The above-described clutch control circuit 22, reaction force control circuit 33, and steering operation control circuit 44 are implemented by hardware including a microcomputer and an I/O circuit and software including a program executed by the microcomputer.

Now, a power feeding path will be described. Various in-vehicle control apparatuses including the clutch control circuit 22, the reaction force control circuit 33, and the steering operation control circuit 44 are each supplied with power from a DC power supply 51 such as a battery mounted in the vehicle. Various sensors including the rotation angle sensor 31c, the torque sensor 32, the first rotation angle sensor 41b, and the second rotation angle sensor 42b are also supplied with power from the DC power supply 51.

For example, the reaction force control circuit 33 is connected to the DC power supply 51 via a first power feeding line 52 and a second power feeding line 53 that are independent of each other. The first power feeding line 52 is provided with a power switch 54 for the vehicle, and the second power feeding line 53 is provided with a power relay 55. When the power switch 54 is turned on, power from the DC power supply 51 is supplied to the reaction force control circuit 33 via the first power feeding line 52. When the power relay 55 is turned on, power from the DC power supply 51 is supplied to the reaction force control circuit 33 via the second power feeding line 53.

The reaction force control circuit 33 controls turn-on and -off of the power relay 55. The reaction force control circuit 33 keeps the power relay 55 on for a needed period of time when the power switch 54 is turned off. Thus, even after the power switch 54 is turned off, the reaction force control circuit 33 can operate. When needing no power feeding from the DC power supply 51, the reaction force control circuit 33 enables power feeding to the reaction force control circuit 33 to be interrupted by switching the power relay 55 off. The reaction force control circuit 33 determines whether the power switch 54 is on or off by monitoring a voltage generated across the first power feeding line 52. The reaction force control circuit 33 detects that the power switch 54 has been turned off when the voltage generated across the first power feeding line 52 is lower than a preset voltage threshold.

On the second power feeding line 53, a connection point 56 is set between the power relay 55 and the reaction force control circuit 33. The connection point 56 is connected to, of components of the steering apparatus 10, components which need to operate even after the power switch 54 is turned off similarly to the reaction force control circuit 33. Although illustration of relevant power feeding lines is omitted, the connection point 56 is connected to, for example, the clutch control circuit 22, the reaction force control circuit 33, and the steering operation control circuit 44. The connection point 56 is also connected to the rotation angle sensor 31c, the torque sensor 32, the first rotation angle sensor 41b, the second rotation angle sensor 42b, and the like. Thus, even if the power switch 54 is off, the components connected to the connection point 56 are continuously supplied with power while the power relay 55 is on.

Now, a communication network will be described. Various in-vehicle systems (control apparatuses) including the steering apparatus 10 transmit and receive information to and from one another via an in-vehicle communication network compliant with Controller Area Network (CAN) or FlexRay. For example, the reaction force control circuit 33 is connected to a communication line (communication bus) 57 included in the in-vehicle communication network. The reaction force control circuit 33 can transmit and receive information to and from the in-vehicle systems other than the steering apparatus 10 via the communication line 57. Besides the other in-vehicle systems, the reaction force control circuit 33 can transmit and receive information to and from the other control circuits (the clutch control circuit 22 and the steering operation control circuit 44) included in the same steering apparatus 10, via the communication line 57.

Now, operations of the steering apparatus 10 will be described. While the power switch 54 is on, the reaction force control circuit 33 keeps the clutch 21 disengaged through the clutch control circuit 22. That is, the power transmission path between the steering wheel 11 and the steered wheels 16, 16 is kept mechanically disconnected. In this state, the reaction force control circuit 33 makes the appropriate steering reaction force corresponding to the steering state (steering torque τ) to be generated through driving control of the reaction force motor 31. The steering operation control circuit 44 makes the steering operation force corresponding to the steering state (steering angle θs) to be generated through driving control of the first steering operation motor 41 and the second steering operation motor 42. The steering operation force is applied to the steered shaft 14 to make the operation of steering the steered wheels 16, 16 to be performed.

While the power switch 54 is off, the reaction force control circuit 33 keeps the power relay 55 on to maintain power feeding from the DC power supply 51 to the sections (22, 31c, 32, 33, 41a, 42a, and 44) of the steering apparatus 10. The reaction force control circuit 33 then switches, through the clutch control circuit 22, the state where the clutch 21 is disengaged to the state where the clutch 21 is engaged. That is, the power transmission path is mechanically coupled between the steering wheel 11 and the steered wheels 16, 16. Subsequently, the reaction force control circuit 33 turns the power relay 55 off to interrupt power feeding to the sections of the steering apparatus 10 including the reaction force control circuit 33.

The reason why the clutch 21 is engaged when the power switch 54 is turned off is as follows. Through the steering operation control executed by the steering operation control circuit 44, a given relation is established between the steering state (steering angle $\theta s$) of the steering wheel 11 and the steered state (steered angle $\theta t$) of the steered wheels 16, 16. Given that the steering wheel 11 is steered when the vehicle is powered off, the given relation between the steering state of the steering wheel 11 and the steered state of the steered wheels 16, 16 may be broken if the state where the clutch 21 is disengaged is maintained. Therefore, the clutch 21 is preferably engaged at least when the vehicle is powered off. With the clutch 21 engaged, the steering wheel 11 is interlocked with the steered wheels 16, 16 to maintain the given relation between the steering state of the steering wheel 11 and the steered state of the steered wheels 16, 16.

Furthermore, given that the power switch 54 is turned off while the steering wheel 11 is being operated (rotated), the following situation may occur. That is, since the steering wheel 11 is being operated, the reaction force control by the reaction force control circuit 33 and the steering operation control by the steering operation control circuit 44 are each continuously executed after the power switch 54 is turned off until engagement of the clutch 21 is completed. Therefore, the moment the clutch is engaged, the steering operation force generated by the first steering operation motor 41 and the second steering operation motor 42 may be transmitted to the steering wheel 11, causing rotation of the steering wheel 11 unintended by a driver. Thus, to suppress such unintended rotation of the steering wheel 11, the reaction force control circuit 33 makes engaging the clutch 21 according to a procedure described below.

Figure 2:
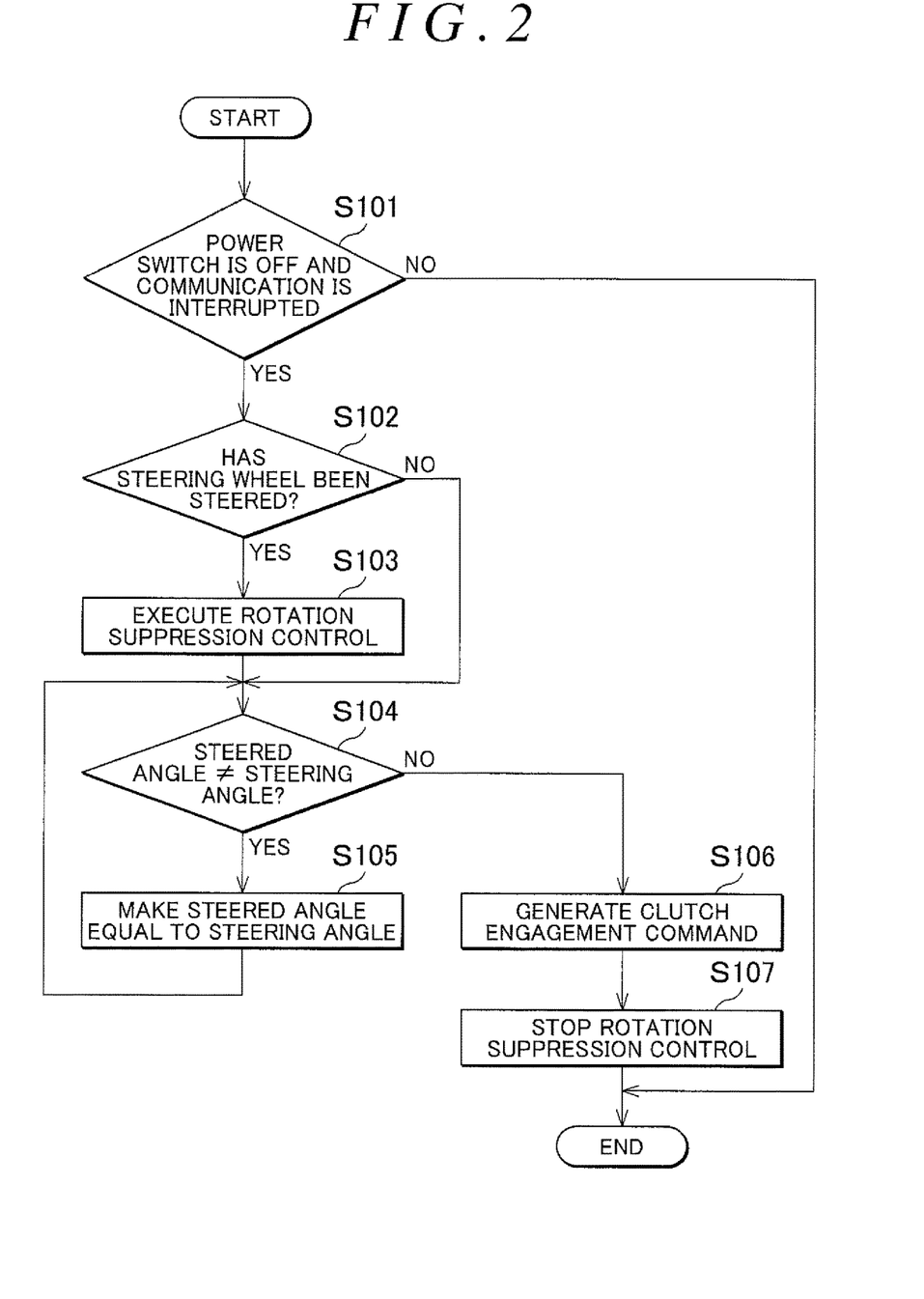
FIG. 2 is a flowchart illustrating an example of a processing procedure for clutch engagement executed by a reaction force control circuit in the first embodiment.

Now, a processing procedure for engaging the clutch 21 executed by the reaction force control circuit 33 will be described. The clutch 21 is assumed to be kept disengaged.

As illustrated in a flowchart in FIG. 2, the reaction force control circuit 33 first determines whether engagement conditions for the clutch 21 are satisfied (step S101). As the engagement condition for the clutch 21, the following two conditions are set.

A first condition is that the power switch 54 is off. A second condition is that the vehicle communication through the communication line 57 is stopped. These conditions are used to make a distinction from a case where power fed from the power supply is interrupted as a result of disruption of the first power feeding line 52.

Upon determining that both the first condition and the second condition are satisfied (in step S101, YES), the reaction force control circuit 33 shifts the process to step S102. In step S102, the reaction force control circuit 33 determines whether the steering wheel 11 has been steered.

Upon determining that the steering wheel 11 has been steered (in step S102, YES), the reaction force control circuit s3 executes the rotation suppression control (step S103). Through execution of the reaction force control, a steering reaction force stronger than the normal reaction force is applied to the steering shaft 12 in order to give the driver the appropriate feeling of response according to the steering state. Thus, steering of the steering wheel 11 is suppressed.

Next, the reaction force control circuit 33 determines whether the steered angle $\theta t$ and the steering angle $\theta s$ are unequal (step S104). Upon determining that the steered angle $\theta t$ and the steering angle $\theta s$ are unequal (in step S104, YES), the reaction force control circuit 33 drives the first steering operation motor 41 and the second steering operation motor 42 so as to make the steered angle $\theta t$ equal to the steering angle $\theta s$ (step S105). The reaction force control circuit 33 then shifts the process to step S104.

Upon determining that the steered angle $\theta t$ and the steering angle $\theta s$ are not unequal (in step S104, NO), the reaction force control circuit 33 generates a clutch engagement command S1 to the clutch control circuit 22 (step S106).

Subsequently, the reaction force control circuit 33 stops execution of the rotation suppression control (step S107) to end the processing. In step S102 described above, upon determining that the steering wheel 11 has not been steered (in step S102, NO), the reaction force control circuit 33 shifts the process to step S104 without executing the rotation suppression control. In step S101 described above, upon determining that at least one of the first and second conditions is not satisfied (in step S101, NO), the reaction force control circuit 33 ends the processing.

Therefore, the first embodiment can produce the following effects.

(1) When the power switch 54 is turned off and a steering operation is performed, the steering reaction force stronger than the normal steering reaction force is applied to the steering shaft 12 through the reaction force motor 31. This suppresses steering of the steering wheel 11. When the steering operation control circuit 44 ends execution of the steering operation control (the control that makes the actual steered angle $\theta t$ equal to the target steered angle corresponding to the steering angle $\theta s$), the clutch 21 is engaged. That is, when the apparatus determines that the operation of steering the steered wheels 16, 16 is not to be performed, the clutch 21 is engaged. This suppresses rotation of the steering wheel 11 unintended by the driver and caused by the operation of steering the steered wheels 16, 16 when the power switch 54 is turned off.

(2) The steering reaction force generated by the reaction force motor 31 is increased to suppress rotation of the steering wheel 11. This eliminates the need for a special configuration for suppressing rotation of the steering wheel 11.

(3) The driver may continuously attempt to steer the steering wheel 11. In this regard, the reaction force control circuit 33 cancels the rotation suppression control after generating the clutch engagement command S1. Consequently, the rotation suppression control is continuously executed when the clutch 21 is engaged, making more reliable suppression of rotation of the steering wheel 11 unintended by the driver.

(4) As the engagement condition for the clutch 21, the first condition and the second condition are set. Setting the two conditions makes enhancement of reliability of determination of whether the vehicle is in the state where the clutch 21 is to be engaged. When, for example, the first power feeding line 52, which connects the DC power supply 51 and the reaction force control circuit 33 together, is disconnected, the reaction force control circuit 33 may erroneously detect turn-off of the power switch 54. In this regard, even if power-off is detected, when vehicle communication through the communication line 57 is continuously active, the apparatus determines that any abnormality has occurred in the power feeding path including the first power feeding line 52 and that the clutch 21 is not to be engaged.

(5) When the power switch 54 is turned off and the steering operation is performed, the control that suppresses steering of the steering wheel 11 is executed, so that the reaction force control and the steering operation control can end earlier after the power switch 54 is turned off. This is because stoppage of the steering operation also causes execution of the reaction force control to be stopped. Stoppage of the steering operation also prevents a change in steering angle, causing execution of the steering operation control to be stopped earlier. Therefore, the clutch 21 can be engaged earlier.

(6) The clutch control circuit 22, the reaction force control circuit 33, and the steering operation control circuit 44 are provided as independent hardware resources. Thus, the clutch control circuit 22, the reaction force control circuit 33, and the steering operation control circuit 44 can be easily and appropriately mounted in the steering apparatus 10 and thus in the vehicle body. For example, the reaction force control circuit 33 can be provided near the reaction force motor 31 to be controlled by the reaction force control circuit 33, and the steering operation control circuit 44 can be provided near the first steering operation motor 41 and the second steering operation motor 42 to be controlled by the steering operation control circuit 44. This also enables shortening of a wire connecting the reaction force control circuit 33 and the reaction force motor 31 together and wires connecting the steering operation control circuit 44 and the first and second steering operation motors 41 and 42. Moreover, the reaction force control circuit 33 and the reaction force motor 31 to be controlled by the reaction force control circuit 33 can be integrated together. Similarly, the steering operation control circuit 44 and the first steering operation motor 41 or the second steering operation motor 42 to be controlled by the steering operation control circuit 44 can be integrated together.

Now, a steer-by-wire steering apparatus in a second embodiment of the invention will be described. In the present example, the steering apparatus is basically configured similarly to the steering apparatus in the first embodiment depicted in FIG. 1. Therefore, components of the second embodiment that are the same as those of the first embodiment are denoted by the same reference numerals and will not be described below in detail. The present example can also be implemented in combination with the first embodiment.

The reaction force control circuit 33 has a function to detect an abnormality in components of the reaction force unit that is a configuration for generating a steering reaction force, that is, the reaction force motor 31, the rotation angle sensor 31*c*, and the torque sensor 32. The reaction force control circuit 33 also has a self-diagnosis function to detect an abnormality in the reaction force control circuit 33, which is a component of the reaction force unit.

The reaction force control circuit 33 is the same as the reaction force control circuit 33 in the first embodiment in that both circuits execute the engagement and disengagement control that engages and disengages the clutch 21 in a switchable manner based on whether or not the clutch engagement condition is satisfied. However, the clutch engagement condition in this case includes a third condition.

A third condition is that an abnormality is detected in at least one of the reaction force motor 31, the rotation angle sensor 31*c*, and the torque sensor 32, which are the components of the reaction force unit. To make the clutch 21 to be engaged when the third condition is satisfied, the reaction force control circuit 33 executes phase fixing control that fixes a current conduction phase of the reaction force motor 31, as rotation suppression control for the reaction force unit so as to suppress rotation of the steering wheel 11 unintended by the driver. The reaction force motor 31 is electrically locked to suppress rotation of the steering wheel 11.

The steering operation control circuit 44 has a function to detect an abnormality in the components of the steering operation unit that is a configuration for generating a steering operation force, that is, the first steering operation motor 41, the second steering operation motor 42, the first rotation angle sensor 41*b*, and the second rotation angle sensor 42*b*. The steering operation control circuit 44 also has a self-diagnosis function to detect an abnormality in the steering operation control circuit 44, which is a component of the steering operation unit.

The steering operation control circuit 44 also executes the engagement and disengagement control that engages and disengages the clutch 21 in a switchable manner based on whether or not the clutch engagement condition is satisfied. To make the clutch 21 to be engaged, the steering operation control circuit 44 generates a clutch engagement command S1 to the clutch control circuit 22. To make the clutch 21 to be disengaged, the steering operation control circuit 44 generates a clutch disengagement command S2 to the clutch control circuit 22. The clutch engagement condition in this case includes a fourth condition.

A fourth condition is that an abnormality is detected in at least one of the first steering operation motor 41, the second steering operation motor 42, the first rotation angle sensor 41*b*, the second rotation angle sensor 42*b*, and the steering operation control circuit 44, which are the components of the steering operation unit.

To make the clutch 21 to be engaged when the fourth condition is satisfied, the steering operation control circuit 44 executes phase fixing control that fixes a current conduction phase of each of the first and second steering operation motors 41 and 42 as rotation suppression control for the steering operation unit that suppresses rotation of each of the first and second pinion shafts 13 and 45 so as to suppress an unintended operation of steering the steered wheels 16, 16. The first steering operation motor 41 and the second steering operation motor 42 are electrically locked to suppress the operation of steering the steered wheels 16, 16.

The reaction force control circuit 33 and the steering operation control circuit 44 also monitor each other. This mutual monitoring is performed to detect abnormalities that are impossible to detect simply with self-diagnoses executed by each of the reaction force control circuit 33 and the steering operation control circuit 44. The reaction force control circuit 33 and the steering operation control circuit 44 transmit and receive information to and from each other via the communication line 57 to check each other for an abnormality. When an abnormality is detected in at least one of the reaction force control circuit 33 and the steering operation control circuit 44 through the mutual monitoring, the reaction force control circuit 33 and the steering operation control circuit 44 generate a clutch engagement command S1. That is, the clutch engagement condition in this case includes a fifth condition.

A fifth condition is that an abnormality is detected in at least one of the reaction force control circuit 33 and the steering operation control circuit 44 through the mutual monitoring.

The condition includes a case where the reaction force control circuit 33 and the steering operation control circuit 44 fail to determine which of the circuits 33, 44 is normal and which of the circuits 33, 44 is abnormal.

To make the clutch 21 to be engaged when the fifth condition is satisfied, the reaction force control circuit 33 executes the phase fixing control on the reaction force motor 31. To make the clutch 21 to be engaged when the fifth condition is satisfied, the steering operation control circuit 44 executes the phase fixing control on each of the first and second steering operation motors 41, 42.

The following is the reason why the phase fixing control is executed on the reaction force motor 31 and the first and second steering operation motors 41, 42 to make the clutch 21 to be engaged when the third to fifth conditions are satisfied.

That is, a slight time lag is present between generation of the clutch engagement command S1 by the reaction force control circuit 33 and the steering operation control circuit 44 and completion of engagement of the clutch 21. Thus, the steering apparatus 10 may fail to be kept in a normal operating state between generation of the clutch engagement command S1 and completion of engagement of the clutch 21. For example, a rotating operation of the steering wheel 11 and an operation of steering the steered wheels 16, 16 that are unintended by the driver may result from the reaction force control and the steering operation control based on an abnormal sensor signal. Therefore, when the clutch 21 is engaged if an abnormality is detected in the reaction force unit or the steering operation unit (the third to fifth conditions are satisfied), the phase fixing control is preferably executed on each of the reaction force motor 31 and the first and second steering operation motors 41, 42.

The reaction force control circuit 33 has a counter 33a. The reaction force control circuit 33 measures, through the counter 33a, time elapsed since generation of the clutch engagement command S1. The steering operation control circuit 44 has a counter 44a. The steering operation control circuit 44 measures, through the counter 44a, time elapsed since generation of the clutch engagement command S1. The reaction force control circuit 33 and the steering operation control circuit 44 (to be exact, these storage circuits) each store a threshold time. The threshold time is a time determined, for example, through simulation that uses a vehicle model and is an estimated time from generation of the clutch engagement command S1 until engagement of the clutch 21 is completed.

Now, a processing procedure for steering control executed by the reaction force control circuit 33 and the steering operation control circuit 44 will be described in accordance with a flowchart in FIGS. 3A and 3B. The processing related to the steering control is triggered by turn-on of the power switch 54. For convenience of description, the flowchart in FIGS. 3A and 3B incorporates the processing executed by the reaction force control circuit 33, the processing executed by the steering operation control circuit 44, and the processing for the mutual monitoring between the reaction force control circuit 33 and the steering operation control circuit 44.

Figure 3A:
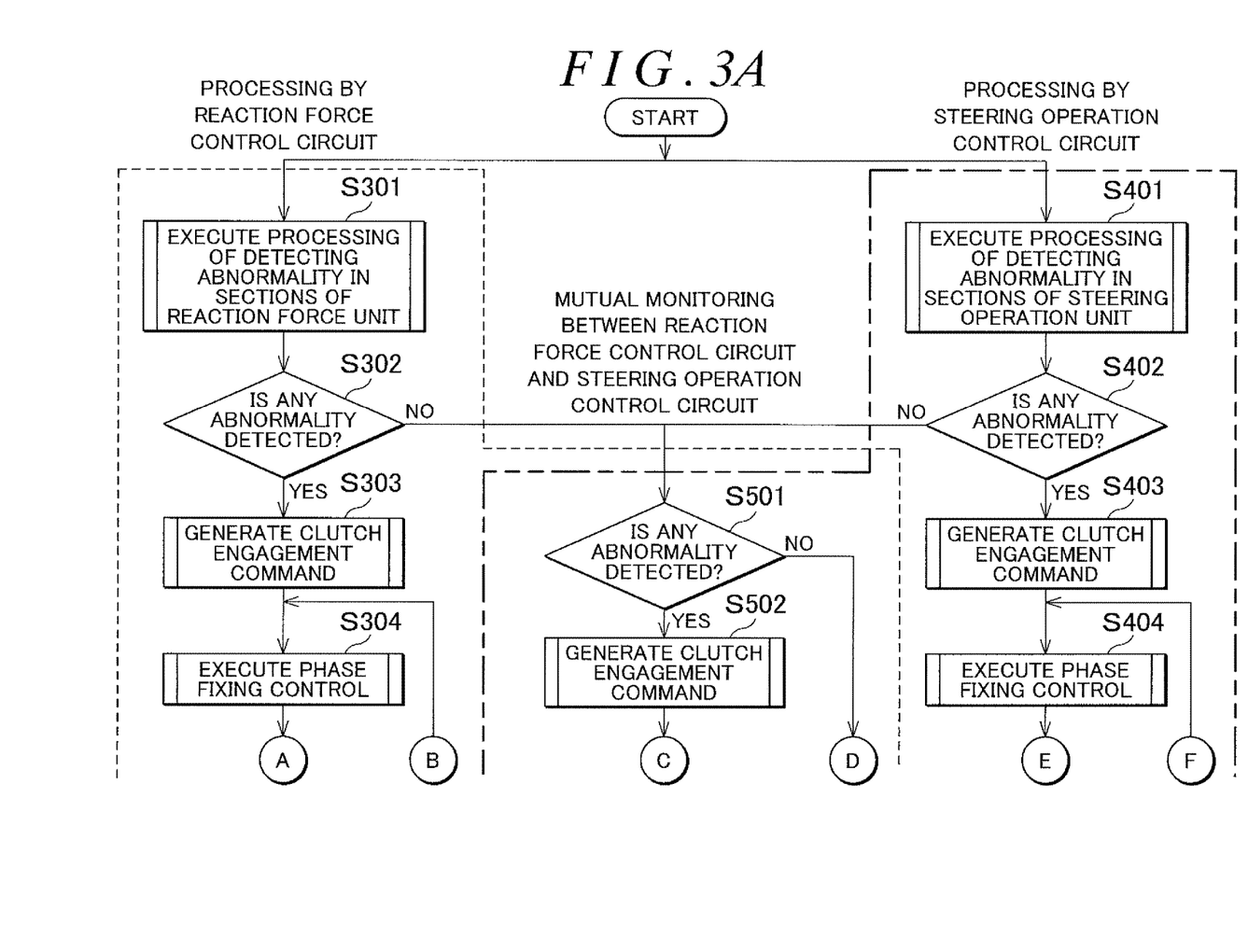
FIGS. 3A and 3B is a flowchart illustrating respective processing procedures for steering control executed by a reaction force control circuit and a steering operation control circuit in a second embodiment.
Figure 3B:
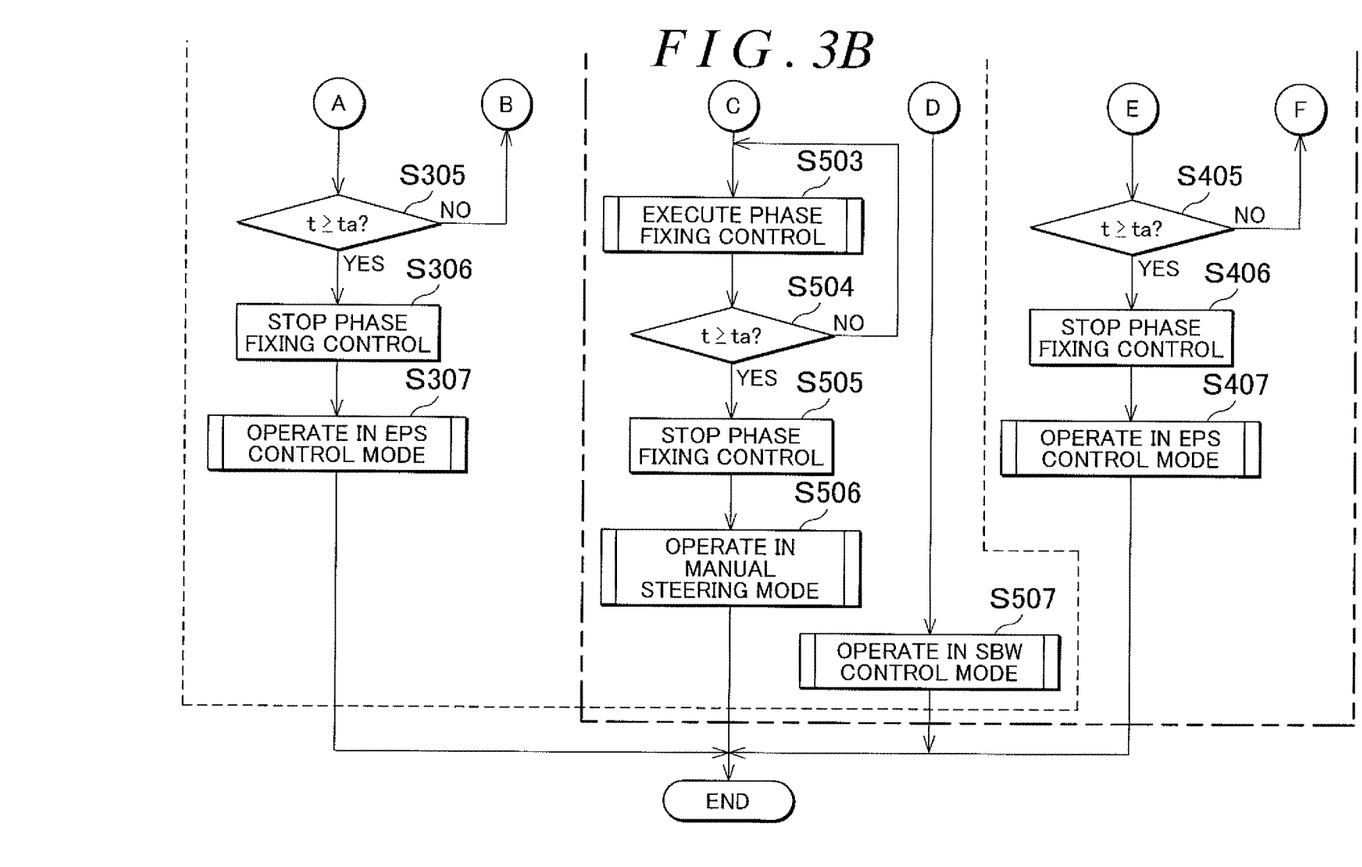

As depicted in a left portion of the flowchart in FIGS. 3A and 3B, when the steering control starts to be executed, the reaction force control circuit 33 executes processing of detecting an abnormality in the sections of the reaction force unit (step S301) and determines whether each section of the reaction force unit is abnormal (step S302).

Upon determining that any section of the reaction force unit is abnormal (in step S302, YES), the reaction force control circuit 33 generates a clutch engagement command S1 (step S303) and then executes the phase fixing control on the reaction force motor 31 (step S304). Specifically, the reaction force control circuit 33 conducts current with the phase thereof fixed through the reaction force motor 31. The reaction force control circuit 33 also generates a phase fixing command to the steering operation control circuit 44. The steering operation control circuit 44 conducts current with the phase thereof fixed through each of the first and second steering operation motors 41, 42 based on the phase fixing command generated by the reaction force control circuit 33.

Next, the reaction force control circuit 33 determines whether a time t elapsed since generation of the clutch engagement command S1 in step S303 described above is equal to or longer than a threshold time ta (step S305).

Upon determining that the elapsed time t is equal to or longer than the threshold time ta (in step S305, YES), the reaction force control circuit 33 stops execution of the phase fixing control (step S306). Subsequently, the reaction force control circuit 33 operates in an electric power steering control mode (EPS control mode) (step S307).

The reaction force control circuit 33 operates in the EPS control mode as follows. The reaction force control circuit 33 stops control of the reaction force motor 31. The reaction force control circuit 33 generates a control mode command to the steering operation control circuit 44. The control mode command is a command causing the steering operation control circuit 44 to operate in the EPS control mode rather than in a steer-by-wire control mode (SBW control mode). The steering operation control circuit 44 switches the control mode thereof to the EPS control mode based on the control mode command generated by the reaction force control circuit 33. The steering operation control circuit 44 assists the operation of the steered shaft 14 by applying an assists force (steering operation assist force) to the steered shaft 14 through at least one of the first and second steering operation motors 41,42. Accordingly, the driver's steering operation is assisted.

Now, the processing executed by the steering operation control circuit 44 will be described below. As depicted in a right portion of the flowchart in FIGS. 3A and 3B, when the steering control starts to be executed, the steering operation control circuit 44 executes processing of detecting an abnormality in the sections of the steering operation unit (step S401) and determines whether each section of the steering operation unit is abnormal (step S402).

Upon determining that any section of the steering operation unit is abnormal (in step S402, YES), the steering operation control circuit 44 generates a clutch engagement command S1 (step S403) and then executes the phase fixing control on each of the first and second steering operation motors 41, 42 (step S404). Specifically, the steering operation control circuit 44 conducts current with the phase thereof fixed through each of the first and second steering operation motors 41, 42. The steering operation control circuit 44 also generates a phase fixing command to the reaction force control circuit 33. The reaction force control circuit 33 conducts current with the phase thereof fixed through the reaction force motor 31 based on the phase fixing command generated by the steering operation control circuit 44.

Next, the steering operation control circuit 44 determines whether the time t elapsed since generation of the clutch engagement command S1 in step S403 described above is equal to or longer than the threshold time ta (step S405). Upon determining that the elapsed time t is equal to or longer than the threshold time ta (in step S405, YES), the steering operation control circuit 44 stops execution of the phase fixing control (step S406). Subsequently, the steering operation control circuit 44 operates in the EPS control mode (step S407).

The steering operation control circuit 44 operates in the EPS control mode as follows. The steering operation control circuit 44 stops control of each of the first and second steering operation motors 41, 42. The steering operation control circuit 44 generates a control mode command to the reaction force control circuit 33. The control mode command is a command causing the reaction force control circuit 33 to operate in the EPS control mode rather than in the SBW control mode. The reaction force control circuit 33 switches the control mode thereof to the EPS control mode based on the control mode command generated by the steering operation control circuit 44. The reaction force control circuit 33 assists the rotating operation of the steering shaft 12 by applying an assists force (steering operation assist force) to the steering shaft 12 through the reaction force motor 31. Accordingly, the driver's steering operation is assisted.

Now, the processing for the mutual monitoring between the reaction force control circuit 33 and the steering operation control circuit 44 will be described. As depicted in a central portion of the flowchart in FIGS. 3A and 3B, upon determining in step S302 described above that none of the sections of the reaction force unit is abnormal (in step S302, NO), the reaction force control circuit 33 shifts the process to step S501. Upon determining in step S402 described above that none of the sections of the steering operation unit is abnormal (in step S402, NO), the steering operation control circuit 44 shifts the process to step S501.

In step S501, the reaction force control circuit 33 and the steering operation control circuit 44 each determine whether the results of the mutual monitoring are abnormal. Upon determining that an abnormality has occurred in at least one of the reaction force control circuit 33 and the steering operation control circuit 44 (in step S501, YES), the reaction force control circuit 33 and the steering operation control circuit 44 each generate a clutch engagement command S1 (step S502).

Next, the reaction force control circuit 33 and the steering operation control circuit 44 execute the phase fixing control on the respective control targets (step S503). Specifically, the reaction force control circuit 33 conducts current with the phase thereof fixed through the reaction force motor 31. The steering operation control circuit 44 conducts current with the phase thereof fixed through each of the first and second steering operation motors 41, 42.

Subsequently, the reaction force control circuit 33 and the steering operation control circuit 44 determine whether the time t elapsed since generation of the clutch engagement command S1 in step S502 described above is equal to or longer than the threshold time ta (step S504).

Upon determining that the elapsed time t is equal to or longer than the threshold time ta (in step S504, YES), the reaction force control circuit 33 and the steering operation control circuit 44 stop execution of the phase fixing control (step S505).

Subsequently, the reaction force control circuit 33 and the steering operation control circuit 44 each operate in a manual steering mode (step S506). The reaction force control circuit 33 and the steering operation control circuit 44 operate in the manual steering mode as follows. The reaction force control circuit 33 stops control of the reaction force motor 31. The steering operation control circuit 44 stops control of each of the first and second steering operation motors 41, 42. Although generation of an assist force by the reaction force motor 31 and the first and second steering operation motors 41 and 42 is not carried out, the driver can steer the steered wheels 16, 16 by operating the steering wheel 11. This is because the clutch is engaged. At this time, the steered wheels 16, 16 are steered only by the steering torque t applied by the driver.

Upon determining, through the mutual monitoring in step S501 described above, that no abnormality has occurred in the reaction force control circuit 33 or the steering operation control circuit 44 (in step S501, NO), the reaction force control circuit 33 and the steering operation control circuit 44 each operate in the SBW control mode (step S507).

The reaction force control circuit 33 and the steering operation control circuit 44 operate in the SBW control mode as follows. The reaction force control circuit 33 keeps the clutch 21 disengaged through the clutch control circuit 22. In this state, the reaction force control circuit 33 makes the appropriate steering reaction force corresponding to the steering state (steering torque τ) to be generated through driving control of the reaction force motor 31. The steering operation control circuit 44 makes the steering operation force corresponding to the steering state (steering angle θs) to be generated through driving control of the first steering operation motor 41 and the second steering operation motor 42.

Therefore, the second embodiment can produce the following effects.

(1) When an abnormality is detected in at least one of the reaction force unit and the steering operation unit, the clutch 21 is engaged. At this time, the phase fixing control is executed on each of the reaction force motor 31 and the first and second steering operation motors 41, 42 after the clutch engagement command S1 is generated until engagement of the clutch 21 is completed. This makes suppression of an unintended rotating operation of the steering wheel 11 and an unintended operation of steering the steered wheels 16, 16 that result from execution of the reaction force control and the steering operation control based on an abnormal sensor signal.

(2) After engagement of the clutch 21 is completed, execution of the phase fixing control on each of the reaction force motor 31 and the first and second steering operation motors 41, 42 is stopped to enable the steered wheels 16, 16 to be steered using the steering torque τ applied by the driver. Steering of the steering wheel 11 is then assisted through one of the reaction force motor 31 and the first and second steering operation motors 41, 42 that has not been determined to be abnormal. Thus, even when any abnormality is detected in the reaction force motor 31 or the first and second steering operation motors 41, 42, steering of the steering wheel 11 can be smoothly continued.

The first and second embodiments may be modified as follows. In the first embodiment, the clutch 21 may be engaged when any abnormality occurs in the components such as the reaction force motor 31 that generates a steering reaction force or the components such as the first steering operation motor 41 and the second steering operation motor 42 that generate a steering operation force. The steered wheels 16, 16 can be steered using the steering torque ti applied by the driver.

In the first embodiment, when any abnormality occurs in the components such as the first steering operation motor 41 and the second steering operation motor 42 that generates a steering operation force, the driver may be assisted in steering the steering wheel 11 using the reaction force motor 31. At this time, the reaction force control circuit 33 switches the state where the clutch 21 is disengaged to the state where the clutch 21 is engaged. Consequently, the power transmission path between the steering wheel 11 and the steered wheels 16, 16 is mechanically coupled. The reaction force control circuit 33 calculates a target assist force based on the steering torque τ detected through the torque sensor 32, and controls power feeding to the reaction force motor 31 so as to make the actual assist force applied to the steering shaft 12 through the reaction force motor 31 equal to the calculated target assist force. Similarly, when any abnormality occurs in the components such as the reaction force motor 31 that generates a steering reaction force, the driver may be assisted in steering the steering wheel 11 using at least one of the first and second steering operation motors 41, 42. However, in this case, the steering operation control circuit 44 also enables engagement and disengagement of the clutch 21 to be controlled through the clutch control circuit 22.

In the first embodiment, the second condition, included in the engagement condition for the clutch 21, may be omitted. The engagement and disengagement control for the clutch 21 may be executed based on whether or not at least the first condition is satisfied.

In the first embodiment, when the clutch engagement condition is satisfied and a turning force is applied to the steering wheel 11, the steering reaction force is generated through the reaction force motor 31 to suppress steering of the steering wheel 11. However, this may be modified as follows. As depicted by a long dashed double-short dashed line in FIG. 1, the reaction force motor 31 is provided with a mechanical brake 31b that is actuated to regulate (decelerate or stop) rotation of the reaction force motor 31 (to be exact, a rotating shaft thereof). Since the reaction force motor 31 is coupled to the steering shaft 12 via the reduction mechanism 31a, regulated rotation of the reaction force motor 31 also regulates rotation of the steering shaft 12 and thus rotation of the steering wheel 11. As the brake 31b, for example, an excited electromagnetic brake is adopted. When a voltage is applied to an excitation coil of the brake 31b not depicted in the drawings, a braking force acts on the rotating shaft of the reaction force motor 31.

In the first embodiment, when the clutch engagement condition is satisfied and a turning force is applied to the steering wheel 11, the steering reaction force is generated through the reaction force motor 31 to suppress steering of the steering wheel 11. However, this may be modified as follows. The reaction force control circuit 33 executes, as the rotation suppression control, the phase fixing control that fixes the current conduction phase of the reaction force motor 31. The reaction force motor 31 is electrically locked to suppress rotation of the steering wheel 11.

In the first embodiment, processing of checking whether engagement of the clutch 21 is completed may be interposed between step S106 and step S107 in the flowchart in FIG. 2. That is, after generating a clutch engagement command S1 in step S106 in the flowchart in FIG. 2, the reaction force control circuit 33 checks whether engagement of the clutch 21 is completed. Upon determining that engagement of the clutch 21 is completed, the reaction force control circuit 33 shifts the process to step S107 to stop execution of the rotation suppression control. In this case, for example, a clutch sensor 21a that detects an engagement state of the clutch 21 is provided as depicted by a long dashed double-short dashed line in FIG. 1. The reaction force control circuit 33 determines, through the clutch sensor 21a, whether engagement of the clutch 21 is completed.

In the first embodiment, the order of the processes of step S106 and step S107 in the flowchart in FIG. 2 may be reversed. In this case, although execution of the rotation suppression control is stopped before the clutch 21 is engaged, the clutch 21 is engaged after the operation of steering the steered wheels 16, 16 is completed (in step S104, YES) as in the case of the original procedure. Thus, unless, for example, the driver continuously attempts to steer the steering wheel 11, unintended rotation of the steering wheel 11 resulting from engagement of the clutch 21 is basically prevented.

In the first embodiment, both processes of step S104 and step S105 in the flowchart in FIG. 2 may be omitted. In this case, the reaction force control circuit 33 starts execution of the rotation suppression control in step S103 and then shifts the process to step S106 to generate a clutch engagement command S1. The reaction force control circuit 33 also shifts the process to step S106 when the determination result in step S102 is NO (the steering wheel 11 has not been steered). In this case, when the engagement condition for the clutch 21 is satisfied and the steering wheel 11 is steered, the clutch 21 is engaged after execution of the rotation suppression control is started. Consequently, rotation of the steering wheel 11 unintended by the driver is suppressed.

When both processes of step S104 and step S105 in the flowchart in FIG. 2 are omitted in the first embodiment, the following modification may be made to the procedure. When a given time has elapsed since the start of execution of the rotation suppression control in step S103, the process shifts to step S106 to generate a clutch engagement command S1. In this case, for example, the reaction force control circuit 33 is provided with a counter 33a as depicted by a long dashed double-short dashed line in FIG. 1. The counter 33a is used to measure time elapsed since the start of execution of the rotation suppression control. The given time measured using the counter 33a may be set, through, for example, simulation that uses a vehicle model, to time roughly estimated to elapse until execution of the steering operation control is stopped.

When the both processes of step S104 and step S105 in the flowchart in FIG. 2 are omitted in the first embodiment, the following modification may be made to the procedure. When a given time has elapsed since the start of execution of the rotation suppression control in step S103, which is set to be a reference, the process may shift to step S107 to stop execution of the rotation suppression control. In this case as well, the counter 33a is used to measure the time elapsed since the start of execution of the rotation suppression control. Furthermore, the process of step S106 may be executed after execution of the process of step S107.

In the second embodiment, the reaction force control circuit 33 and the steering operation control circuit 44 may each detect completion of engagement of the clutch 21 through a sensor or the like. Upon detecting completion of engagement of the clutch 21, the reaction force control circuit 33 and the steering operation control circuit 44 stop the phase fixing control. In the flowchart in FIGS. 3A and 3B, the three processes of step S305, step S405, and step S504 correspond to processing of determining whether completion of engagement of the clutch 21 is detected.

In the second embodiment, in some situations, the phase fixing control may be difficult to execute if an abnormality occurs in at least one of the reaction force control circuit 33 and the steering operation control circuit 44. In this case, an appropriate power relay may be provided on the power feeding path between the DC power supply 51 and the reaction force control circuit 33 and on the power feeding path between the DC power supply 51 and the steering operation control circuit 44, and control circuits on which the phase fixing control is difficult to execute may independently interrupt power feeding to themselves. For example, when the reaction force control circuit 33 has become abnormal and the phase fixing control is difficult to execute on the reaction force motor 31, the reaction force control circuit 33 turns the appropriate power relay off to interrupt only the power feeding to the reaction force control circuit 33. Consequently, abnormal reaction force control by the reaction force control circuit 33 is stopped. This also applies to the steering operation control circuit 44.

In the second embodiment, the clutch engagement condition may include detection of an end contact state of the steered shaft 14. The steering operation control circuit 44 makes the clutch 21 to be engaged, for example, when the steered shaft 14 is expected to come into an end contact state based on the steered angle θt detected based on at least one of the rotation angle θ1 of the first steering operation motor 41 and the rotation angle θ2 of the second steering operation motor 42. The end contact state refers to a state where the steered shaft 14 has moved a maximum permissible moving distance (the steered shaft 14 has reached a steering limit) when the driver steers the steering wheel 11 clockwise or counterclockwise with respect to a neutral position. In this case, the clutch 21 is engaged before the end contact state (steering limit) is reached.

In the second embodiment, the mutual monitoring function provided by the reaction force control circuit 33 and the steering operation control circuit 44, that is, the processes of steps S501 to S506 in the flowchart in FIGS. 3A and 3B, may be omitted. In this case, when the determination result in step S302 is NO and the determination result in step S402 is also NO, the reaction force control circuit 33 and the steering operation control circuit 44 each shift the process to step S507 to execute the SBW control.

In the second embodiment, both processes of step S307 and step S407 in the flowchart in FIGS. 3A and 3B may be omitted. In this case, when the phase fixing control is stopped in each of steps S305 and S406, the process may shift to step S506 so that the reaction force control circuit 33 and the steering operation control circuit 44 are operated in a manual mode.

In the first and second embodiments, the steering angle θs is detected based on the detection result (the rotation angle of the reaction force motor 31) from the rotation angle sensor 31c provided in the reaction force motor 31. However, this configuration may be modified as follows. For example, a steering angle sensor 43 is provided between the torque sensor 32 and a portion of the steering shaft 12 to which the reduction mechanism 31a is coupled as depicted by a long dashed double-short dashed line in FIG. 1. The steering angle sensor 43 detects the rotation angle of the steering shaft 12 as the steering angle θs, which is the rotation angle of the steering wheel 11.

In the first and second embodiment, the reaction force control circuit 33 may detect a vehicle speed that is a traveling speed of the vehicle through a vehicle speed sensor not depicted in the drawings, to control driving of the reaction force motor 31 with the detected vehicle speed taken into account. The steering operation control circuit 44 may also control each of the first and second steering operation motors 41, 42 with the vehicle speed taken into account. This makes a more appropriate steering reaction force and a more appropriate steering operation force to be generated in accordance with the traveling state of the vehicle.

In the first and second embodiments, power may be supplied to the sensors via the reaction force control circuit 33 and the steering operation control circuit 44. For example, the reaction force control circuit 33 supplies power to the sensors included in the reaction force unit, and the steering operation control circuit 44 supplies power to the sensors included in the steering operation unit.

In the first and second embodiments, the reaction force control circuit 33 and the clutch control circuit 22 may be integrated into a single control circuit. This configuration includes a case where the reaction force control circuit 33 has the function of the clutch control circuit 22. Alternatively, the steering operation control circuit 44 and the clutch control circuit 22 may be integrated into a single control circuit. This configuration includes a case where the steering operation control circuit 44 has the function of the clutch control circuit 22. Alternatively, the function of the clutch control circuit 22 may be provided in any of the other in-vehicle control circuits different from the reaction force control circuit 33 and the steering operation control circuit 44. Alternatively, the reaction force control circuit 33, the clutch control circuit 22, and the steering operation control circuit 44 may be configured into a single integrated control circuit. As described above, the clutch control function may be provided in any control circuit so long as the control circuit is an in-vehicle control circuit (electronic control unit (ECU)). The reaction force control circuit 33, the clutch control circuit 22, and the steering operation control circuit 44 may be implemented using only hardware.

In the first and second embodiments, as an example, what is called a dual-pinion steering apparatus is taken which transmits the torques of the first steering operation motor 41 and the second steering operation motor 42 to the steered shaft 14 through the respective pinion shafts (13 and 45). However, a steering apparatus of a type as described below may be embodied. For example, the steering apparatus may include only one of the first and second steering operation motors 41, 42. Alternatively, what is called a rack-direct-drive steering apparatus may be embodied which transmits a steering operation force directly to the steered shaft 14 by use of a steering operation motor provided coaxially with the steered shaft 14 instead of the first steering operation motor 41 and the second steering operation motor 42.

The invention claimed is:

1. A steering apparatus comprising:
a clutch that connects and disconnects a power transmission path between a steering wheel and a steered wheel;
a reaction force motor that generates a steering reaction force that is a torque acting in a direction opposite to a steering direction and applied to a portion of the power transmission path located between the steering wheel and the clutch;
a steering operation motor that generates a steering operation force that is power making the steered wheel to be steered and that is applied to a portion of the power transmission path located between the clutch and the steered wheel; and
a control apparatus that executes engagement and disengagement control for the clutch based on whether or not a clutch engagement condition is satisfied, reaction force control that generates, through the reaction force motor, a steering reaction force corresponding to a steering state, and steering operation control that makes the steered wheel to be steered in accordance with the steering state through the steering operation motor, wherein
when the clutch engagement condition is satisfied and a state where the power transmission path is disconnected is switched to a state where the power transmission path is connected, the control apparatus executes rotation suppression control that suppresses rotation of the steering wheel by the reaction force motor or by both the reaction force motor and the steering operation motor.

2. The steering apparatus according to claim 1, wherein, when the clutch engagement condition is satisfied and the state where the power transmission path is disconnected is switched to the state where the power transmission path is connected, if a turning force is determined to be applied to the steering wheel, the control apparatus makes the clutch to be engaged after the rotation suppression control starts to be executed.

3. The steering apparatus according to claim 1, wherein, the control apparatus executes the rotation suppression control by controlling power feeding to the reaction force motor so as to generate a steering reaction force stronger than a steering reaction force generated through execution of normal reaction control.

4. The steering apparatus according to claim 1, wherein, the reaction force motor has a brake that regulates rotation of the reaction force motor, and
the control apparatus executes the rotation suppression control by controlling the brake so as to regulate the rotation of the reaction force motor.

5. The steering apparatus according to claim 1, wherein, the steering operation control involves steering the steered wheel so as to make a steered angle of the steered wheel equal to a steering angle of the steering wheel, and
after starting execution of the rotation suppression control, the control apparatus makes the clutch to be engaged when the steered angle of the steered wheel is equal to the steering angle of the steering wheel.

6. The steering apparatus according to claim 1, wherein, the control apparatus stops execution of the rotation suppression control after making the clutch to be engaged.

7. The steering apparatus according to claim 6, wherein, the control apparatus includes a clutch control circuit that executes the engagement and disengagement control for the clutch, a reaction force control circuit that executes each of the reaction force control and the rotation suppression control, and a steering operation control circuit that executes the steering operation control, and
when making the clutch to be engaged, the reaction force control circuit stops execution of the rotation suppression control after generating a clutch engagement command to the clutch control circuit.

8. The steering apparatus according to claim 1, wherein, the control apparatus is connected to a communication line mounted in a vehicle, and
the clutch engagement condition includes a first condition that the vehicle is powered off or both the first condition and a second condition that communication through the communication line is stopped.

9. The steering apparatus according to claim 1, wherein, the clutch engagement condition includes a third condition that an abnormality is detected in components for generating a steering reaction force including the reaction force motor and a fourth condition that an abnormality is detected in components for generating a steering operation force including a steering operation motor, and
when at least one of the third and fourth conditions is satisfied, the control apparatus executes the rotation suppression control by performing phase fixing control that fixes a current conduction phase of the reaction force motor in order to suppress rotation of the steering wheel and by performing phase fixing control that fixes a current conduction phase of the steering operation motor in order to suppress an operation of steering the steered wheel.

10. The steering apparatus according to claim 9, wherein, when an abnormality is detected in the components for generating the steering reaction force and engagement of the clutch is determined to be completed, the control apparatus assists steering of the steering wheel through the steering operation motor after stopping execution of the rotation suppression control, and on the other hand, when an abnormality is detected in the components for generating the steering operation force and engagement of the clutch is determined to be completed, the control apparatus assists steering of the steering wheel through the reaction force motor after stopping execution of the rotation suppression control.

11. The steering apparatus according to claim 1, having, as independent hardware resources, a reaction force control circuit that executes the reaction force control and a steering operation control circuit that executes the steering operation control.

12. The steering apparatus according to claim 1, wherein, when the clutch engagement condition is satisfied and a turning force is applied to the steering wheel, the control apparatus engages the clutch after starting execution of the rotation suppression control that suppresses rotation of the steering wheel resulting from the turning force, through the reaction force motor.

13. The steering apparatus according to claim 1, wherein the suppression of the steering wheel rotation corresponds to a steering torque of the steering shaft.

* * * * *